United States Patent
Lim

(10) Patent No.: US 6,176,401 B1
(45) Date of Patent: Jan. 23, 2001

(54) HOLSTER FOR A PORTABLE COMMUNICATION DEVICE

(75) Inventor: Wei Seong Lim, Singapore (SG)

(73) Assignee: Motorola, Inc., Schaumburg, IL (US)

( * ) Notice: Under 35 U.S.C. 154(b), the term of this patent shall be extended for 0 days.

(21) Appl. No.: 09/483,960

(22) Filed: Jan. 18, 2000

(30) Foreign Application Priority Data

Feb. 12, 1999 (SG) .................................................. 9900568

(51) Int. Cl.[7] .................................................. B65D 83/00
(52) U.S. Cl. ..................... 224/196; 224/269; 224/666; 224/678; 224/930; 379/446; 379/455; D3/218
(58) Field of Search ................................ 224/196, 197, 224/241, 269, 666, 678, 679, 929, 930; D3/218, 215, 216; 24/3.7, 3.9, 3.11, 3.12; 248/231.81; 379/446, 455; 455/90, 344

(56) References Cited

U.S. PATENT DOCUMENTS

| | | | |
|---|---|---|---|
| D. 369,359 | * 4/1996 | Wright et al. ..................... | D3/218 X |
| D. 389,641 | * 1/1998 | McCutcheon et al. ............... | D3/218 |
| D. 406,191 | * 3/1999 | Phillips et al. ......................... | D3/218 |
| 4,299,344 | * 11/1981 | Yamashita et al. .................. | 224/242 |
| 5,253,292 | * 10/1993 | Fluder et al. ......................... | 379/426 |
| 5,988,577 | * 11/1999 | Phillips et al. .................. | 248/231.81 |
| 5,995,622 | * 11/1999 | Roussy et al. ........................ | 379/446 |
| 6,029,871 | * 2/2000 | Park .................................... | 224/197 |

* cited by examiner

Primary Examiner—Stephen K. Cronin
(74) Attorney, Agent, or Firm—Philip P. Macnak

(57) ABSTRACT

A holster (1) for a for portable communication device is disclosed. The holster (1) has a housing (2) and a garment attachment clip (4). Movably coupled to the housing (2) is a biased latch (5) comprising a locking member (6) an ejector member (7) and an ejector actuator member (8). The locking member (6) and interior surfaces of (9) of the housing (2) co-act to lock a portable communication device in the housing (2). Further, actuation of the ejector actuator member (8) against the bias of the latch (5) provides for unlocking of a portable communication device and at least partial ejection thereof from the housing (2).

9 Claims, 4 Drawing Sheets

HOLSTER FOR A PORTABLE COMMUNICATION DEVICE

FIELD OF THE INVENTION

This invention relates to a holster for a portable communication device.

BACKGROUND ART

Portable communication devices such as cellphones or pagers are commonly used to allow people to be readily contactable. For instance, when considering a pager, the pager alerts a user when a selective call message addressed to the pager has been received, and, if the pager utilises an output device such as a liquid crystal display (LCD), the user may read the message. Because the user may desire to carry a pager during certain times of the day, the pager may be permanently attached to a belt clip. This clip allows the user to secure the pager to an article of clothing such as a belt or a pocket. However, if the pager utilises an LCD to present the message to the user, the user may be unable to read the message, due to the typically small size of the LCD, while the pager is secured to his belt. Under such a circumstance, the user might need to remove the pager from his belt to bring the pager LCD into his line of vision in order to read each message received by the pager. Similarly, if the user has a cellphone with an attached belt clip, the cellphone will usually have to be removed from the belt before a telephone conversation can commence.

To circumvent the above problem, belt clips that are permanently attached to portable communication devices may be placed within holsters which incorporate a belt clip which is typically fastened to a belt or other article of clothing. Generally, the user avoids having to unfasten the belt clip from his belt every time he desires to use the portable communication device by simply sliding it from the holster.

Conventional holsters secure the communication within the holsters in a number of ways. Some conventional holsters incorporate a snap fitment to secure the communication device. In contrast, other conventional holsters are designed to provide an interference fit with the inserted communication device, however these holsters are flexible enough so that the pager may be inserted and removed by the user. Still other holsters have a retaining element that surrounds the inserted communication device, this retaining element is deflected by the force of the user inserting or removing the communication device from the holster.

Unfortunately, none of the prior art holsters provide adequate securement or locking of communication devices whilst allowing ease of removal.

SUMMARY OF THE INVENTION

It is an aim of the invention to overcome or alleviate at least one of the problems associated with prior art holsters for portable communication devices or at least provide the public with a useful alternative.

According to one aspect of the invention there is provided a holster for a for portable communication device, the holster comprising:

a housing having interior surfaces for mounting a communication device;

a garment attachment clip on said housing;

a biased latch movably coupled to said housing, said latch having a locking position bias, and said latch having a locking member, an ejector member and an ejector actuator member, wherein said locking member and at least one of said interior surfaces co-act to lock said portable communication device in said housing, and wherein actuation of said ejector actuator member against said bias provides for unlocking of said portable communication device and at least partial ejection thereof from said housing, said ejection resulting from said ejector member providing a force on a surface of said communication device.

Preferably, said locking member and at the least one of said interior surfaces may sandwich said portable communication device in said housing.

The least one of said interior surfaces may each suitably have an internal corner portions to lock said portable communication device in said housing.

Preferably, said locking member and said ejector member may co-act to grip said communication device.

Suitably, said locking member may have a protrusion for engaging a said portable communication device.

The biased latch may have a fulcrum portion to assist in unlocking of said portable communication device.

Preferably, said latch may be integrally moulded with said housing.

Suitably, said actuation member may be actuatable in a direction towards said at least one of said interior surfaces that co-act with said locking member.

Preferably, there may be at least one movement restrictor for limiting movement of said biased latch.

BRIEF DESCRIPTION OF THE DRAWINGS

In order that the invention may be readily understood and put into practical affect, reference will now be made to a preferred embodiment as illustrated with reference to the accompanying drawings in which.

DETAILED DESCRIPTION OF A PREFERRED EMBODIMENT OF THE INVENTION

Figure 1:
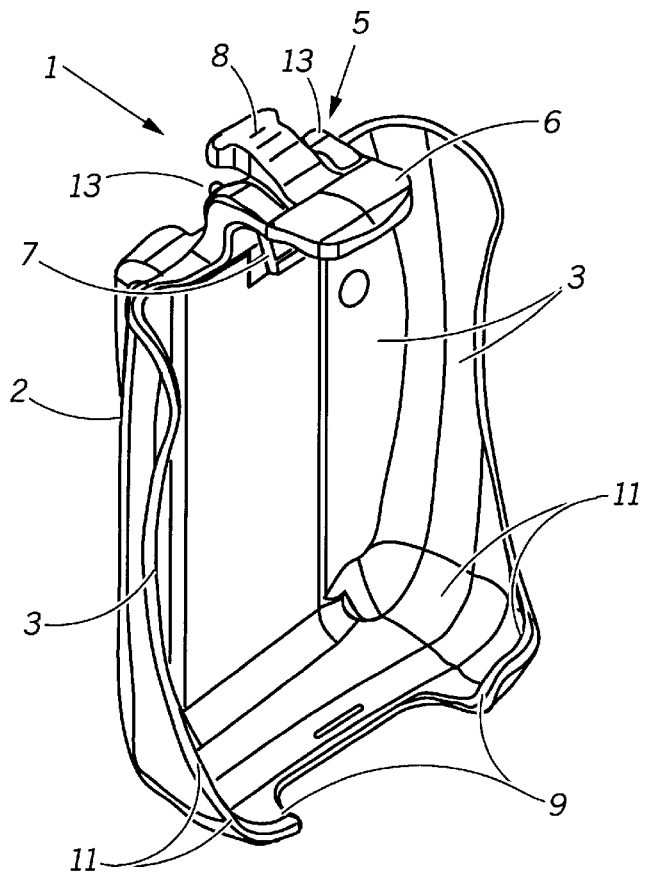
FIG. 1 is a perspective view of a preferred embodiment of a holster in accordance with the invention.
Figure 2:
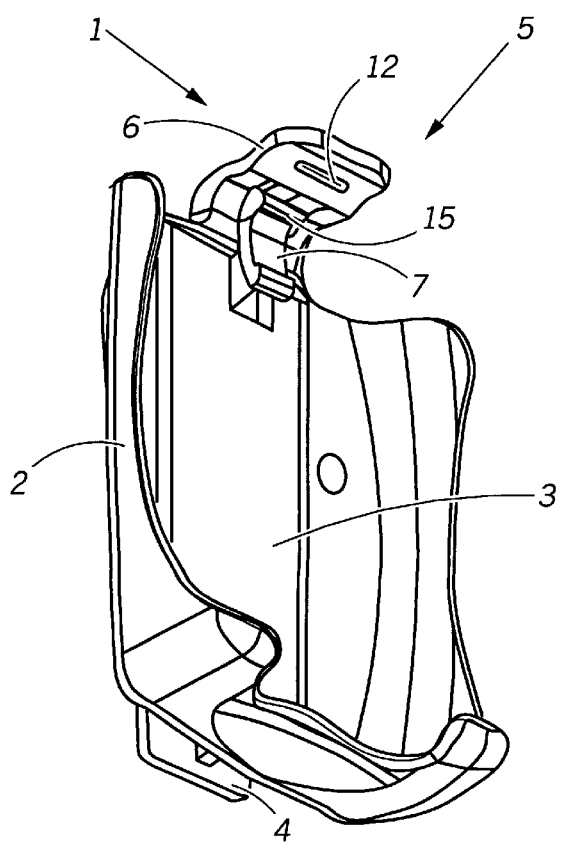
FIG. 2 is another perspective view of the holster of FIG. 1.
Figure 3:
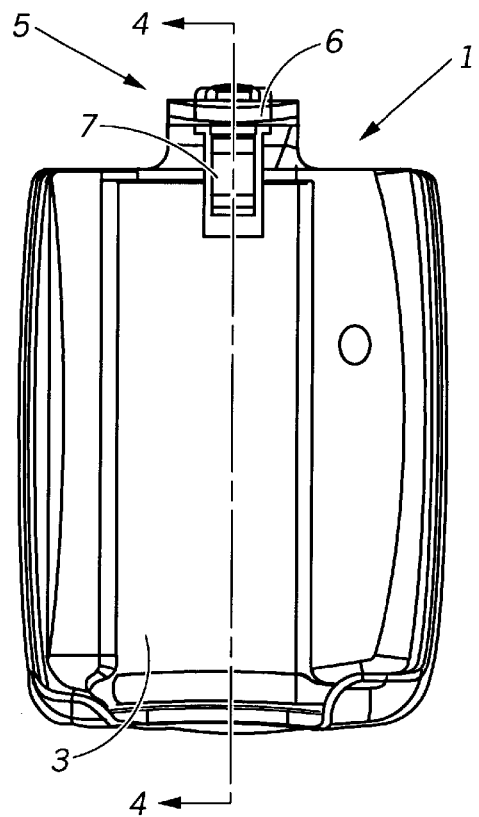
FIG. 3 is a front view of the holster of FIG. 1.
Figure 4:
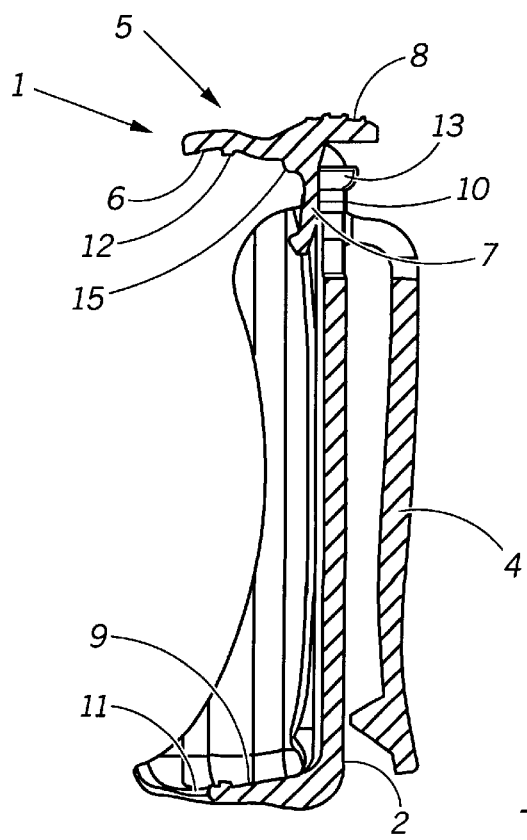
FIG. 4 is a cross sectional view through A–A' of the holster of FIG. 3.

With reference to FIGS. 1 to 4, there is illustrated a holster 1 for a for portable communication device. The holster 1 has a housing 2 having interior surfaces 3 for mounting a communication device to the housing 2. There is a garment attachment clip 4 on an outer surface 10 of housing 2 and a biased latch 5 is integrally moulded with the housing 2. The biased latch 5 and housing 2 are integrally moulded from a resilient plastics material and are and moulded to be moveably coupled to each other. The biased latch 5 is biased to a locking position and has a locking member 6 with a protrusion 12, an ejector member 7, an ejector actuator member 8 and a fulcrum portion 15. Adjacent the biased latch 5 and on outer surface 10 are movement restrictors 13 for limiting movement of ejector actuator member 8 as will be apparent to a person skilled in the art.

The interior surfaces 3 include co-acting interior surfaces 9 and internal corner portions 11 to assist in locking a portable communication device (typically a pager, cellphone or radio) in the housing 2.

Figure 5:
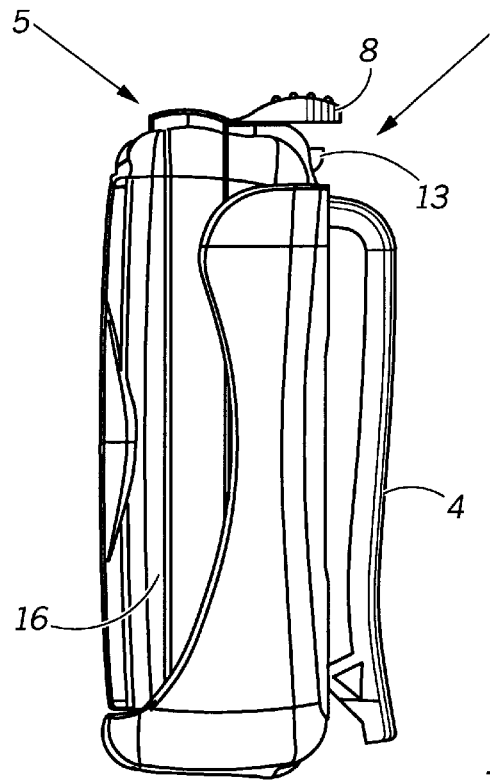
FIG. 5 illustrates the holster of FIG. 1 with a portable communication device mounted thereto.
Figure 6:
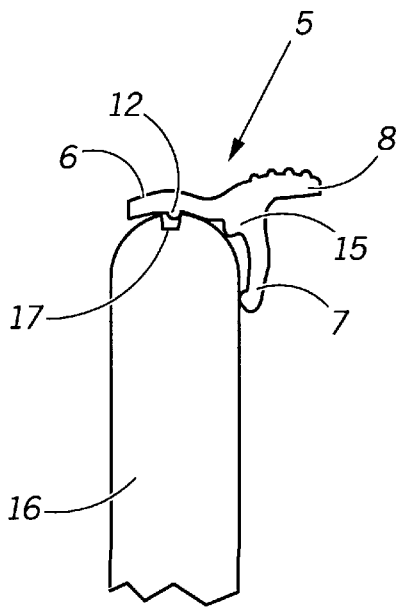
FIG. 6 is a schematic view illustrating a biased latch of the holster of FIG. 1 gripping the communication device of FIG. 5.

In FIGS. 5 and 6 there is illustrated a portable communication device 16 mounted to the housing 2 whereby the biased latch 5 and co-acting interior surfaces 9 sandwich and lock the portable communication device 16 in the housing 2. Furthermore, the internal corner portions 11 assist to lock the portable communication device 16 in the housing 2 and the resilient locking member 6 and ejector member 7 co-act to grip the communication device 16. In this embodiment, the protrusion 12 engages a recess 17 the portable communication device 16 to thereby assist in the gripping thereof.

Figure 7:
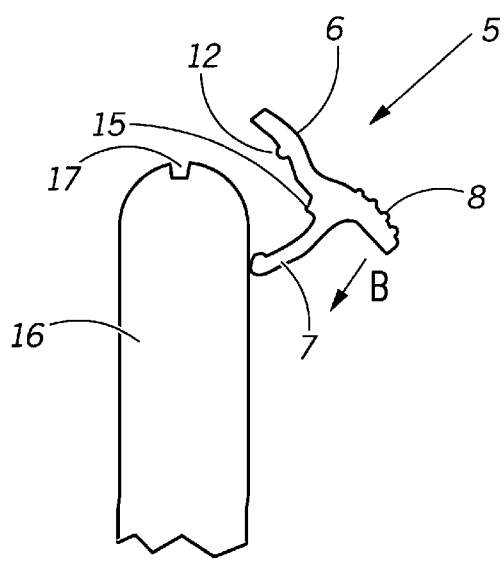
FIG. 7 is a schematic view illustrating the holster of FIG. 1 with a portable communication device being ejected therefrom.
Figure 8:
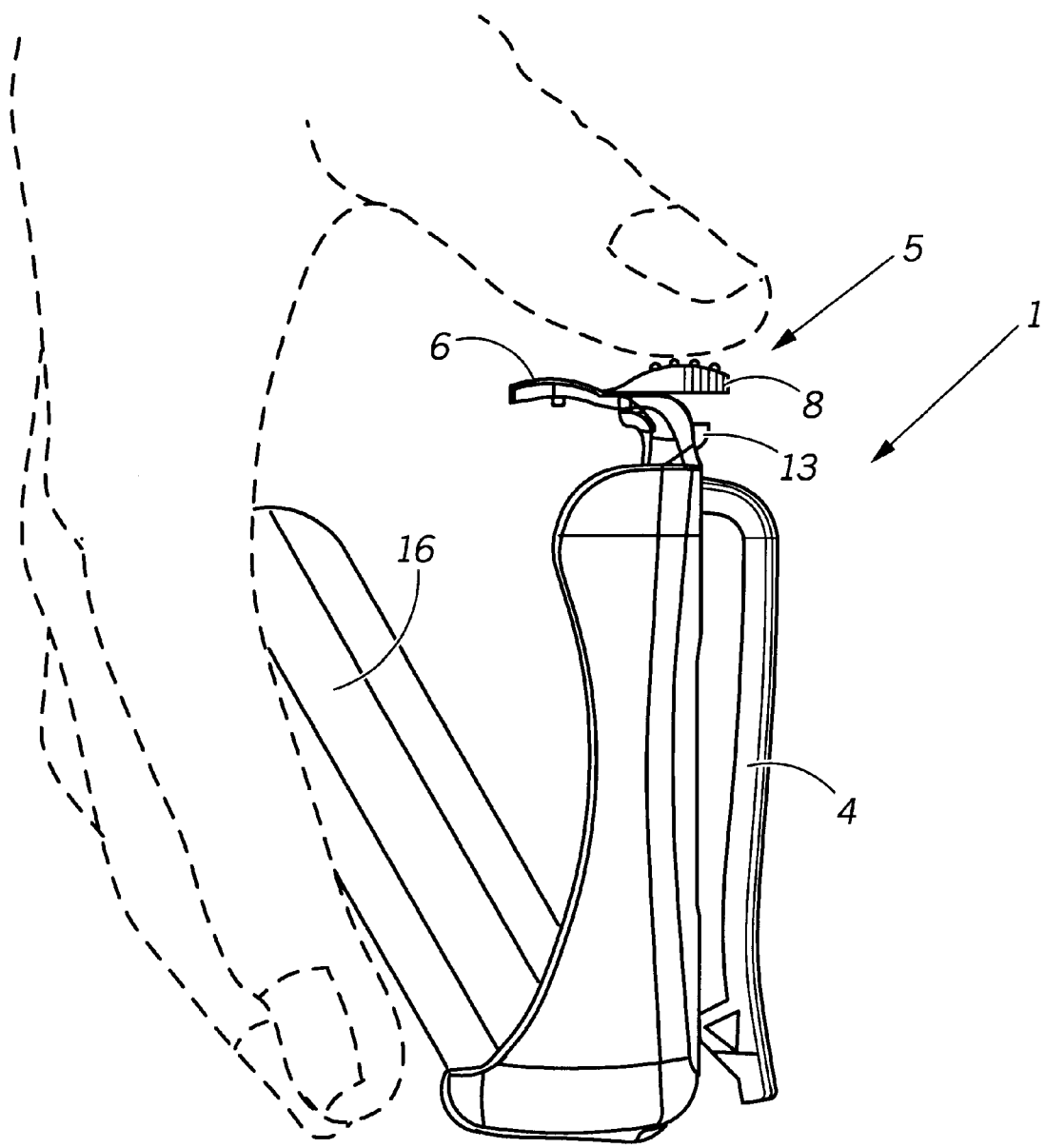
FIG. 8 also illustrates the holster of FIG. 1 with a portable communication device being ejected therefrom.

As illustrated in FIGS. 7 and 8, actuation of the ejector actuator member 8 in a direction towards co-acting interior surfaces 9, indicated by arrow B, against the bias of biased latch 5 provides for unlocking and full or partial ejection of the portable communication device 16 from the housing 2. This ejection results from the ejector member 7 providing a force on a surface of the communication device 16, whereby the fulcrum portion 15 assists in the unlocking and ejection as will be apparent to a person skilled in the art. Further, the movement restrictors 13 limit movement of the ejector actuator member 8 thereby limiting the possibility of damage to biased latch 5 by applied excessive forces. When, for instance, the holster 1 is attached to a belt of a user by clip 4, the user can simply eject the communication device 16 by pressing on the ejector actuator member 8 and collecting the ejected communication device in the user's palm as shown specifically in FIG. 8.

Advantageously, the present invention allows locking of portable communication devices to a holster and also allows for ease of removal and ejection when required.

Although the invention has been described with reference to a preferred embodiment, it is to be understood that the invention is not restricted to the particular embodiment described herein.

I claim:

1. A holster for a portable communication device, the holster comprising:
   a housing having interior surfaces for mounting a communication device;
   a garment attachment clip on said housing;
   a biased latch movably coupled to said housing, said latch having a locking position bias, and said latch having a locking member, an ejector member and an ejector actuator member,
   wherein said locking member and at least one of said interior surfaces co-act to lock said portable communication device in said housing, and
   wherein actuation of said ejector actuator member against said bias provides for unlocking of said portable communication device and at least partial ejection thereof from said housing, said ejection resulting from said ejector member providing a force on a surface of said communication device.

2. A holster as claimed in claim 1, wherein said locking member and at the least one of said interior surfaces sandwich said portable communication device in said housing.

3. A holster as claimed in claim 2, wherein the least one of said interior surfaces each have an internal corner portions to lock said portable communication device in said housing.

4. A holster as claimed in claim 1, wherein said locking member and said ejector member co-act to grip said communication device.

5. A holster as claimed in claim 1, wherein, said locking member has a protrusion for engaging said portable communication device.

6. A holster as claimed in claim 1, wherein the biased latch has a fulcrum portion to assist in unlocking of said portable communication device.

7. A holster as claimed in claim 1, wherein said biased latch is integrally moulded with said housing.

8. A holster as claimed in claim 1, wherein said ejector actuator member is actuatable in a direction towards said at least one of said interior surfaces that co-act with said locking member.

9. A holster as claimed in claim 1, wherein there is at least one movement restrictor for limiting movement of said biased latch.

* * * * *